(12) United States Patent
Boshra

(10) Patent No.: US 9,117,145 B2
(45) Date of Patent: Aug. 25, 2015

(54) FINGER BIOMETRIC SENSOR PROVIDING COARSE MATCHING OF RIDGE FLOW DATA USING HISTOGRAMS AND RELATED METHODS

(71) Applicant: APPLE INC., Cupertino, CA (US)

(72) Inventor: Michael Boshra, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 175 days.

(21) Appl. No.: 13/833,099

(22) Filed: Mar. 15, 2013

(65) Prior Publication Data

US 2014/0270420 A1    Sep. 18, 2014

(51) Int. Cl.
G06K 9/46    (2006.01)
G06K 9/00    (2006.01)
G06K 9/62    (2006.01)

(52) U.S. Cl.
CPC ............ *G06K 9/6212* (2013.01); *G06K 9/0008* (2013.01)

(58) Field of Classification Search
None
See application file for complete search history.

(56) References Cited

U.S. PATENT DOCUMENTS

| 5,926,555 | A | 7/1999 | Ort et al. | |
| 7,114,646 | B2 * | 10/2006 | Hillhouse | 235/375 |
| 7,599,530 | B2 | 10/2009 | Boshra | |
| 7,616,787 | B2 * | 11/2009 | Boshra | 382/124 |
| 2006/0153432 | A1 | 7/2006 | Lo et al. | |
| 2008/0013805 | A1 * | 1/2008 | Sengupta et al. | 382/124 |
| 2009/0285459 | A1 * | 11/2009 | Aggarwal et al. | 382/125 |

FOREIGN PATENT DOCUMENTS

SE    WO0049944    *    8/2000    ............... G06K 9/46

OTHER PUBLICATIONS

Ali, Amjad, et al. "Adaptive Segmentation of Fingerprint Images Using Blocks Overlapping Algorithms." Journal of Computational Information Systems 7.8 (2011): 2803-2810.*

* cited by examiner

*Primary Examiner* — Samir Ahmed
*Assistant Examiner* — Menatoallah Youssef
(74) *Attorney, Agent, or Firm* — Allen, Dyer, Doppelt, Milbrath & Gilchrist, P.A.

(57) ABSTRACT

An electronic device may include a finger biometric sensor and a processor cooperating with the finger biometric sensor. The processor may be capable of determining enrollment finger ridge flow angles over an enrollment area for an enrolled finger, and determining match finger ridge flow angles over a match area for a to-be matched finger. The processor may also be capable of determining at least one likely match sub-area of the enrollment area by dividing the enrollment area into a plurality of regions and determining a respective enrollment ridge flow histogram for each region of the enrollment area, and determining whether the to-be matched finger matches the enrolled finger based upon the at least one likely match sub-area.

17 Claims, 7 Drawing Sheets

| (a) | | BIN 0 | BIN 1 | BIN 2 | BIN 3 |
|---|---|---|---|---|---|
| | ENROLL | 0 | 10 | 0 | 0 |
| | MATCH | 0 | 6 | 4 | 0 |

| (b) | | BIN 0 | BIN 1 | BIN 2 | BIN 3 |
|---|---|---|---|---|---|
| | ENROLL | 0 | 4 | 0 | 0 |
| | MATCH | 0 | 0 | 4 | 0 |

| (c) | | BIN 0 | BIN 1 | BIN 2 | BIN 3 |
|---|---|---|---|---|---|
| | ENROLL | 4 | 0 | 0 | 0 |
| | MATCH | 0 | 0 | 4 | 0 |

| (d) | | BIN 0 | BIN 1 | BIN 2 | BIN 3 |
|---|---|---|---|---|---|
| | ENROLL | 0 | 0 | 4 | 0 |
| | MATCH | 0 | 0 | 4 | 0 |

FINGER BIOMETRIC SENSOR PROVIDING COARSE MATCHING OF RIDGE FLOW DATA USING HISTOGRAMS AND RELATED METHODS

BACKGROUND

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference or enrolled fingerprints already in a database to determine proper identification of a person, such as for verification purposes.

Traditional approaches for fingerprint matching generally rely on minutia, which are point features corresponding to ridge ends and bifurcations. However, minutia-based matchers may have certain drawbacks. First, minutia extraction may be difficult in images of poor quality. Second, a minimum fingerprint area may be needed to extract a reasonable number of minutiae. Thus, minutia-based matchers may be unsuitable in applications where poor quality images or small sensors are involved. Using fingerprint pattern features, instead of minutiae, for matching may potentially mitigate both of these drawbacks. Examples of fingerprint pattern features are image pixel values, ridge flow, and ridge frequency.

Ridge flow information has been used in a variety of stages in fingerprint recognition. It is commonly extracted through tessellating the fingerprint image into small square blocks or cells and estimating the dominant ridge flow within each block. The resulting map is referred to as the ridge flow map.

Despite the existence of such ridge flow techniques, they may not provide desired matching speed for some implementations.

SUMMARY

An electronic device may include a finger biometric sensor and a processor cooperating with the finger biometric sensor. The processor may be capable of determining enrollment finger ridge flow angles over an enrollment area for an enrolled finger, and determining match finger ridge flow angles over a match area for a to-be matched finger. The processor may also be capable of determining at least one likely match sub-area of the enrollment area by dividing the enrollment area into a plurality of regions and determining a respective enrollment ridge flow histogram for each region of the enrollment area, and determining whether the to-be matched finger matches the enrolled finger based upon the at least one likely match sub-area.

More particularly, the processor may be capable of determining whether the to-be matched finger matches the enrolled finger based upon comparing match finger ridge flow angles to enrolled finger ridge flow angles for the at least one likely match sub-area. Furthermore, the processor may be capable of dividing the enrollment area into a plurality of at least partially overlapping regions.

By way of example, the processor may be capable of determining the at least one likely match sub-area by at least dividing the match area into a plurality of regions, and determining a respective match ridge flow histogram for each region of the match area. Moreover, the processor may be capable of determining the at least one likely match sub-area by at least comparing a plurality of enrollment ridge flow histograms with a plurality of match ridge flow histograms. The processor may be capable of determining the at least one likely match sub-area by at least comparing the plurality of enrollment ridge flow histograms with the plurality of match ridge flow histograms at a plurality of relative rotational angles. Also, the processor may be capable of determining the at least one likely match sub-area by at least generating a score based upon comparing the plurality of enrollment ridge flow histograms with the plurality of match ridge flow histograms, and comparing the score to a threshold.

In an example embodiment, the match area may be smaller than the enrollment area. The electronic device may further include a memory coupled to the processor and capable of storing the enrollment finger ridge flow angles. Furthermore, the electronic device may also include a housing carrying the finger biometric sensor and the processor, and a wireless transceiver carried by the housing.

A related finger matching method may include determining enrollment finger ridge flow angles over an enrollment area for an enrolled finger, and determining match finger ridge flow angles over a match area for a to-be matched finger using a finger biometric sensor. The method may further include determining at least one likely match sub-area of the enrollment area by dividing the enrollment area into a plurality of regions and determining a respective enrollment ridge flow histogram for each region of the enrollment area, and determining whether the to-be matched finger matches the enrolled finger based upon the at least one likely match sub-area.

A related non-transitory computer-readable medium may have computer-executable instructions for causing a computer to perform steps including determining enrollment finger ridge flow angles over an enrollment area for an enrolled finger, and determining match finger ridge flow angles over a match area for a to-be matched finger based upon a finger biometric sensor. The steps may further include determining at least one likely match sub-area of the enrollment area by dividing the enrollment area into a plurality of regions and determining a respective enrollment ridge flow histogram for each region of the enrollment area, and determining whether the to-be matched finger matches the enrolled finger based upon the at least one likely match sub-area.

DETAILED DESCRIPTION

The present disclosure is provided with reference to the accompanying drawings, in which example embodiments are shown. However, other embodiments may be used in different applications, and this disclosure should accordingly not be construed as limited to the particular embodiments set forth herein. Rather, these embodiments are provided by way of example so that this disclosure will be thorough and complete. Like numbers refer to like elements throughout.

Figure 1:
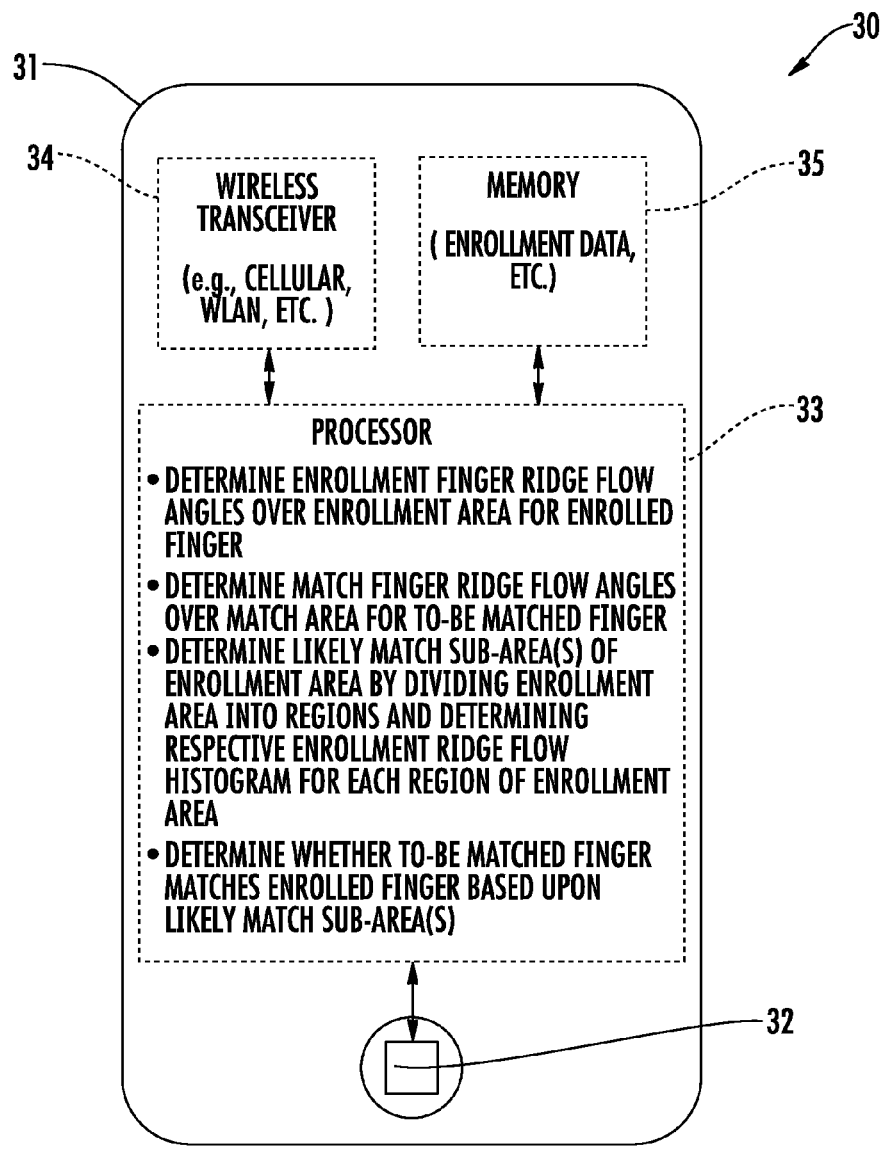
FIG. 1 is schematic block diagram of an electronic device including a finger biometric sensor providing coarse matching of ridge flow data using histograms in accordance with an example embodiment.

Referring initially to FIG. 1, an electronic device 30 illustratively includes a housing 31, a finger biometric sensor 32 carried by the housing, and a processor 33 also carried by the housing and cooperating with the finger biometric sensor. In the illustrated example, the electronic device 30 is a mobile communications device which includes a wireless transceiver 34 carried by the housing 31, such as a cellular or wireless local area network (WLAN) receiver, for example, although other wireless communication formats may also be used. By way of example, the processor 33 may be implemented using a combination of hardware (e.g., microprocessor, etc.) and a non-transitory computer-readable medium having computer-executable instructions for performing the various operations described herein. It should be noted that the various components of the finger biometric sensor 32 described herein may be implemented as a stand-alone electronic device (e.g., a finger biometric chipset), or some of the operations may be performed by shared resources of the electronic device 30 (e.g., a device microprocessor, etc.).

Example mobile communications devices may include telephones, smart phones, laptop computers, tablet computers, personal digital assistants (PDAs), digital cameras, gaming devices, digital display devices, etc. However, it should be noted that in some embodiments the finger biometric sensor 32 and processor 33 may be implemented in other types of electronic devices, such as desktop computers, security terminals or stations for providing access to a restricted area, etc. The electronic device 30 further illustratively includes a memory 35 which may be used for storing information, such as enrollment finger data, for example.

Figure 2:
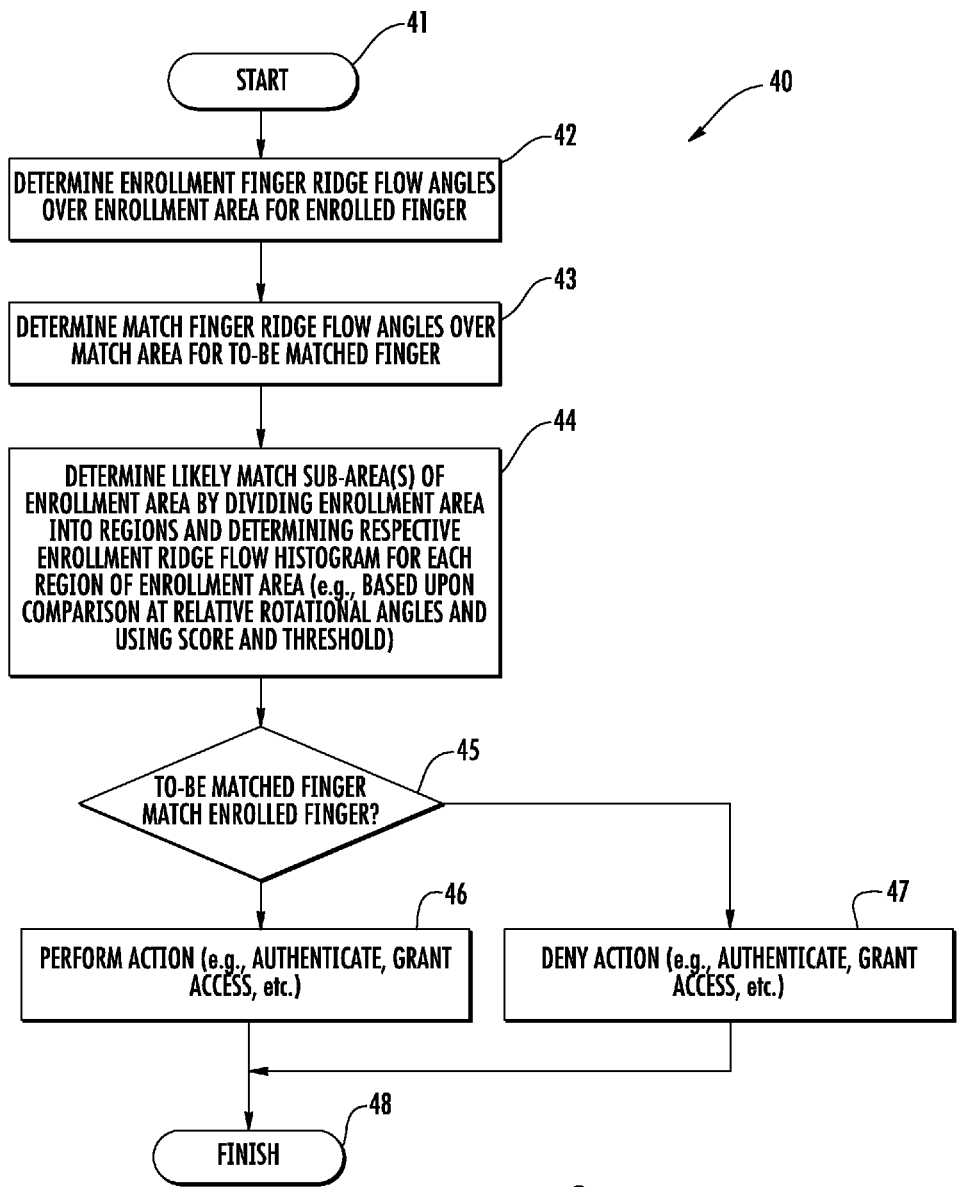
FIG. 2 is a flow diagram illustrating finger biometric sensing method aspects associated with the finger biometric sensor of FIG. 1.
Figure 5:
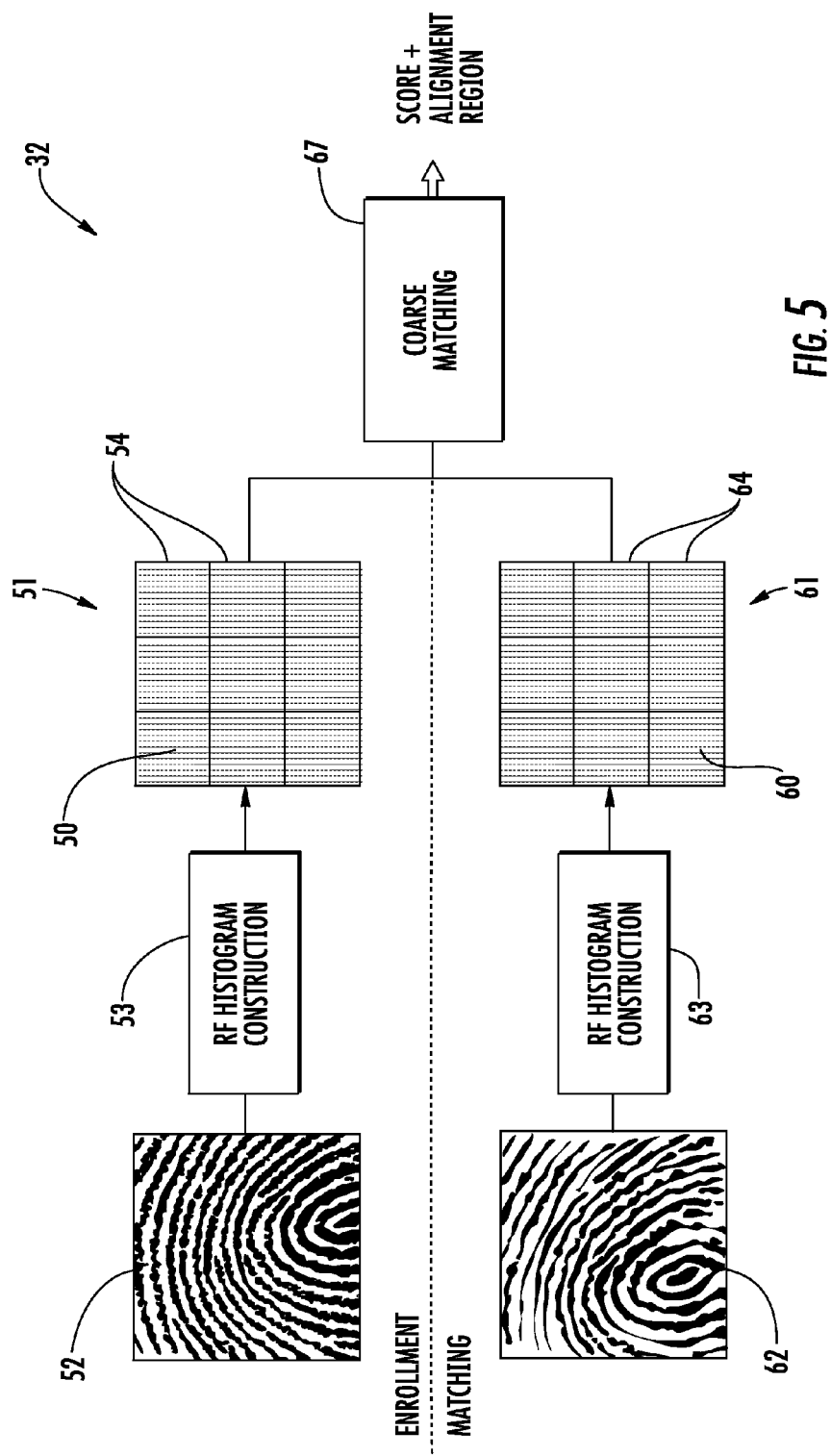
FIG. 5 is a schematic block diagram of an example embodiment of the finger biometric sensor of FIG. 1.

Referring now additionally to the flow diagram 40 of FIG. 2 and also to FIG. 5, beginning at Block 41, the processor 33 may be capable of determining enrollment finger ridge flow angles 50 over an enrollment area 51 for an enrolled finger 52, at Block 42. This is also represented by the ridge flow (RF) histogram construction operation at Block 53 in FIG. 5. The method further illustratively includes determining match finger ridge flow angles 60 over a match area 61 for a to-be matched finger 62, at Block 43. This is also represented by the RF histogram construction operation at Block 63. Further details on ridge flow mapping may be found in U.S. Pat. No. 7,599,530 to Boshra, which is hereby incorporated herein in its entirety by reference. Moreover, it should be noted that, as used herein, "ridge flow angle" is meant to include either ridge orientation (i.e., in a direction parallel to the ridge) ridge normal (i.e., in a direction perpendicular to the ridge), or any angle that is a function of ridge orientation.

The processor 33 determines one or more likely match sub-areas of the enrollment area by dividing the enrollment area into a plurality of regions 54 and determining a respective enrollment ridge flow histogram for each region of the enrollment area, and determining whether the to-be matched finger 62 matches the enrolled finger 52 based upon the at least one likely match sub-area, at Block 44. It should be noted that the above-noted steps may be performed in different orders. For example, histograms for the enrollment data may be generated before match ridge flow data is collected. Moreover, not all of the available enrollment area (or match area) has to be considered. That is, reference to determining an enrollment ridge flow histogram for "each region" of the enrollment area (or match area) herein may pertain to a subset of all of the available regions within a given enrollment (or match) area.

Figure 3:
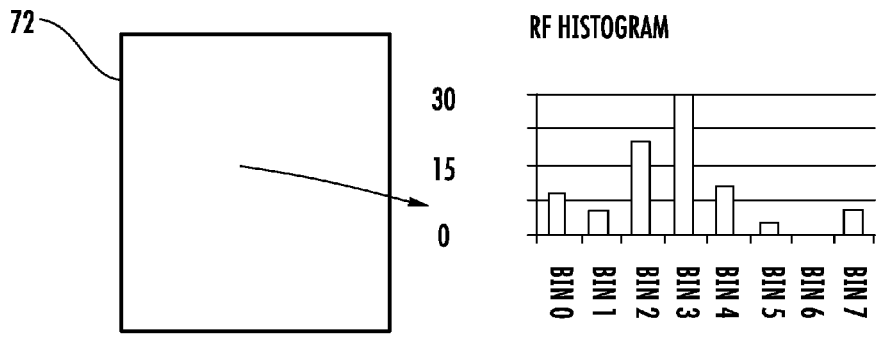
FIGS. 3 and 4 are schematic diagrams respectively illustrating histogram generation for a relatively large sensor area and for smaller sub-areas or regions of the sensor area, which are used in the method of FIG. 2.
Figure 4:
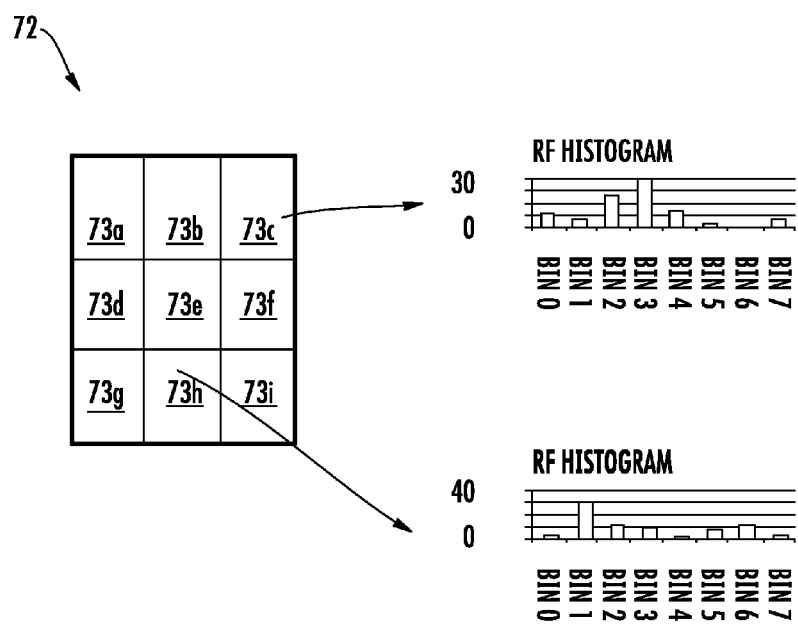

The significance of dividing the enrollment area into the smaller regions 54 will be understood with reference to FIGS. 3 and 4, in which a corresponding histogram is prepared for an overall enrollment area 72 (FIG. 3), and then for nine smaller sub-divided regions 73a-73i of the overall enrollment area. The histogram for the overall enrollment area 72 may be considered a global histogram since it covers the entire area, However, such a global histogram may potentially lose valuable positional information regarding the location of ridge flow data therein. In the illustrated example, the ridge flow histograms have eight bins (Bins 0-7), although different numbers of bins may be used in different embodiments, as will be discussed further below.

On the other hand, such positional information may be more accurately captured through the use of multiple separate histograms for each of the sub-divided regions 73a-73i. In the illustrated example, histograms for the regions 73c and 73h are shown. Generally speaking, the more the overall enrollment area 72 is subdivided, the more accurate the capture of positional information will be. However, this will come with an associated cost in terms of processing, and thus a balance between accuracy and speed may change for different implementations, as will be appreciated by those skilled in the art.

The processor 33 may determine the likely match sub-area(s) by dividing the match area 61 into a plurality of regions 64, and determining a respective match ridge flow histogram for each region of the match area. In particular, the processor 33 may determine the likely match sub-areas by comparing enrollment ridge flow histograms for the enrollment regions 54 with match ridge flow histograms for the match regions 64. In some embodiments, the processor 33 may be capable of dividing the enrollment area into a plurality of at least partially overlapping regions, as will be discussed further below.

Also, the processor 33 may be capable of determining the at least one likely match sub-area by at least generating a score based upon comparing the plurality of enrollment ridge flow histograms with the plurality of match ridge flow histograms, and comparing the score to a threshold, as will be discussed further below. This may be considered to be a coarse matching that is performed to determine candidate enrollment regions 54 for all finger enrollment templates, which are ranked using associated scores, as indicated at Block 67.

The processor 33 may be capable of determining whether the to-be matched finger 62 matches the enrolled finger 52 based upon comparing the match finger ridge flow angles 60 to enrolled finger ridge flow angles 50 for the likely match sub-area(s), at Block 45. For example, a percentage of the top candidate regions 54 (based upon their respective scores) may be examined to determine whether the to-be matched finger matches these regions. By way of example, the top ten percent may be selected as the top candidate regions 54, although other percentages (or a fixed number of regions) may be used. In this way, the initial coarse matching eliminates 90% of the enrollment regions 54 that would otherwise have to be checked during the "fine" matching operation. It should be noted that this example if for 1:1 matching, but in other embodiments 1:Many matching may be used as well.

If the final match is a success, then a given action or operation may be performed by the electronic device (e.g., verification, etc.), at Block 46. Otherwise, the requested action may be denied, at Block 47, which illustratively concludes the method of FIG. 2 (Block 48).

Figure 6:
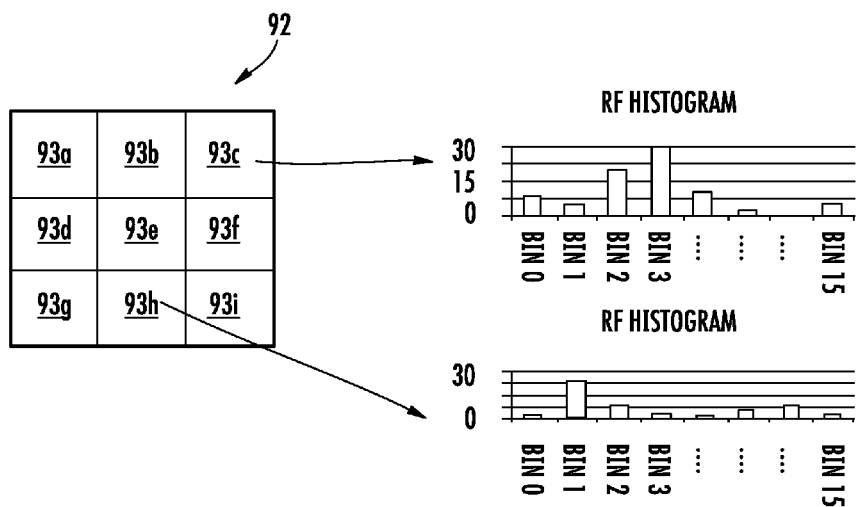
FIG. 6 is a schematic diagram illustrating regional histogram construction in accordance with an example embodiment.

An example approach for histogram construction is now described with reference to FIG. 6. In the illustrated example, an enrollment area 92 is subdivided into a plurality of regions 93a-93i. Ridge flow lines are assigned a given angle from among a range of 256 angles (i.e., where the 256 angles are a quantization of the angle range [0,180]), although other ranges of angles may be used in different embodiments. In the present example, an angle=0 is reserved for bad or faulty angles, although this need not be done in other embodiments. A histogram quantization delta is equal to sixteen, and thus a number of bins for each histogram will be equal to 256/16, or 16.

Figure 7:
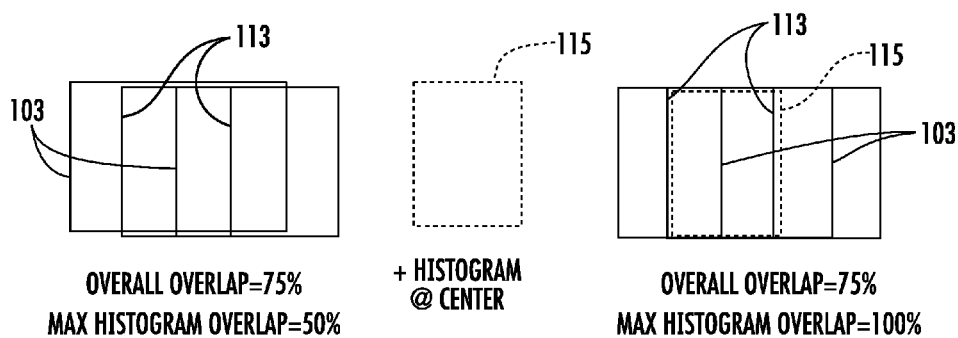
FIGS. 7-10 are schematic block diagrams illustrating multi-histogram construction in accordance with example embodiments.

During construction of the histograms, a ridge flow map for the enrollment area may be tessellated into the plurality of N×N regions 93a-93i, and a separate histogram may be constructed for each region. Here again, the value of N is adjustable, and the value selected will result in a tradeoff between accuracy and speed, as discussed above. Redundant histograms may be added to enrollment data to better handle relative movement between regions. More particularly, in the example of FIG. 7, enrollment regions 103 are compared with match regions 113 to provide an overall overlap of 75% and a maximum histogram overlap of 50%. When combined with a redundant region 115 defining a histogram centralized between the overlapping enrollment regions 103 and match region 113, this still provides an overall overlap of 75%, but now with a maximum histogram overlap of 100%, as will be appreciated by the skilled artisan.

Figure 8:
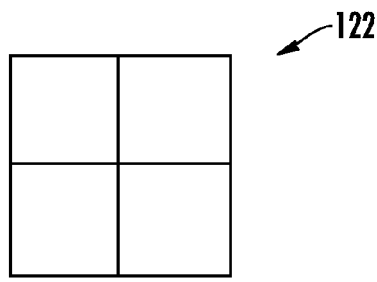
Figure 9A:
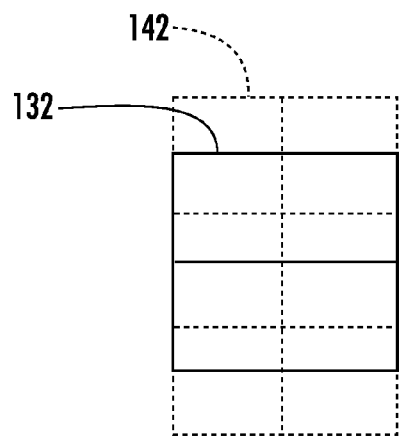
Figure 9B:
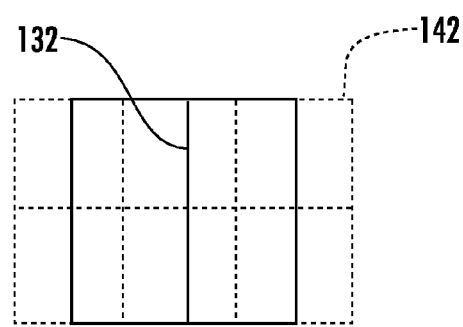
Figure 10:
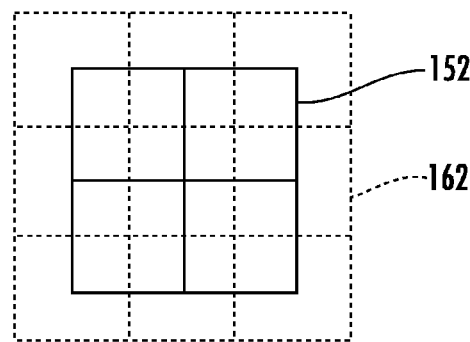

Various redundancy schemes are shown in FIGS. 8-10. By way of comparison, the enrollment area 122 in FIG. 8 is a zero-neighbor (no redundancy) scheme. The scheme illustrated in FIG. 9 is a four-neighbor scheme, in which the regions of the enrollment area 132 and the match area 142 are shifted up and down by one-half of a region relative to one another in (a), and then side-to-side in (b). In FIG. 10, an eight-neighbor scheme, in which diagonal shifting (again by one-half region increments) between the enrollment area 152 and match area 162 is performed in addition to the up/down and side-to-side shift illustrated in FIG. 9. Other schemes with different numbers of neighbors or shifting increments may also be used in different embodiments.

Figures 11, 12:
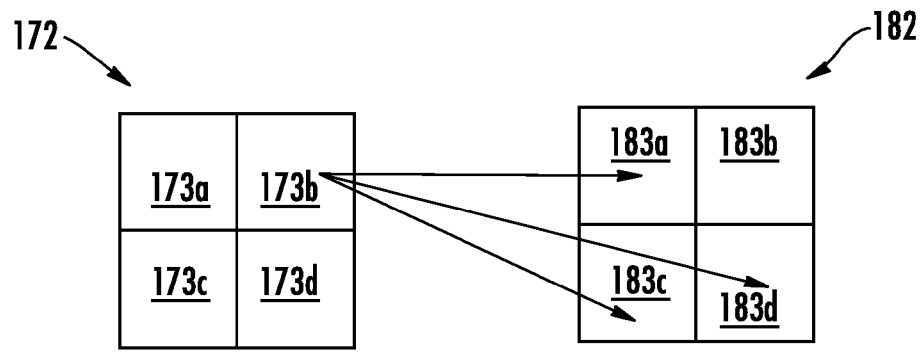
FIG. 11 is a schematic block diagram illustrating histogram comparison for neighboring regions in accordance with an example embodiment.
FIG. 12 is a series of tables illustrating an approach for reducing quantization impact in accordance with an example embodiment.

An example histogram comparison approach which may be used is now described further with reference to FIG. 11. Histograms for enrollment regions 173a-173d of an enrollment area 172 are compared at different rotations with histograms for match regions 183a-183d of a match area 182. That is, the processor 33 compares the plurality of enrollment ridge flow histograms with the plurality of match ridge flow histograms at a plurality of relative rotational angles by comparing histograms for the enrollment regions 173a-173d with adjacent match regions 183a-183d, and not just a directly overlapping region. Thus, in the illustrated example, the histogram for enrollment region 173b is not only compared with the histogram for region 183b, but also with histograms for enrollment regions 183a, 183c, and 183d, which represents a translational and potentially rotational variation in the match area 182 with respect to the enrollment area 172, as will be appreciated by those skilled in the art.

Each comparison generates a similarity score corresponding to a rigid transformation (including rotational as well as horizontal and vertical translations). The similarity scores may be accumulated in a "3D" score or transformation space, in which the highest scores will correspond with the likely alignment (and, thus, the likely match sub-areas). More particularly, the alignment region may be obtained by analyzing neighboring scores, and more than one alignment region may be generated if desired. That is, the top ranking score may not necessarily be the correct one, and thus it may be desirable to look to a plurality of the top scores, as noted above.

An example similarity criterion will now be presented. Let A and B be the two histograms to be compared. Thus, a similarity score=$U(A)+U(B)-K*Dis(A,B)$, where $U(X)$ is a measure of uniqueness of histogram X, $Dis(A,B)$ is distance measure between A and B, and K is and empirically-determined constant. The term $U(X)$ is determined from a distribution of histogram entropy $P(E)$, where $U(X)=-\log(P(Entropy(X)))$. This provides more weight to histograms of unique shape than those of common shapes. With regard to the term $Dis(A,B)$, this is the sum of absolute differences between A and B, i.e., $Dis(A,B)=\|A-B\|$.

Another example similarity criterion is based on a likelihood ratio. For example, let $P_S(x)$ and $P_D(x)$ be the distributions of $Dis(A,B)$ for the following two cases (respectively): A and B belong to the same fingerprint area; and A and B belong to different fingerprint areas. In this case, the similarly score=$\log(P_S(D))-\log(P_d(D))$, where $D=Dis(A,B)$.

Referring now additionally to FIG. 12, an optional approach for reducing the potential quantization impact in the match process is now described. More particularly, quantization effects may be reduced by implementing the following algorithm:

1. Delete matching angles at optimal rotation $\beta$;
2. Match residual histograms at $\beta-\Delta$ and $\beta+\Delta$; and
3. Update original score using a best residual score In the example of FIG. 12, in a first instance (a) a number of matching angles between the enroll and match bins is six (i.e., the six angles recorded in Bin 1 of the match histogram overlap with 6 of the 10 angles recorded in Bin 1 of the enrollment histogram). In the second instance (b), the matching angles are deleted or removed from Bin 1 of the match histogram as per step 1 above. In the third instance (c), a match of residual histograms at $\beta-\Delta$ is found to be zero (i.e., the value "4" in enrollment histogram Bin 1 is shifted to Bin 0 and compared with match Bin 0). Similarly, at the fourth instance (d), a match of residual histograms at $\beta+\Delta$, which is found to be four (i.e., the value "4" in enrollment histogram Bin 1 is shifted to Bin 2 and compared with match Bin 0). As such, the adjusted number of matching angles=$6+K*4$, where K is between 0 and 1 (k=0.5 in the example implementation). More particularly, K may be considered as a weight value representing uncertainty, which may be used to help performance, as will be appreciated by those skilled in the art.

Various techniques may optionally be used to speed up the coarse matching process. For example, a match exclusion may be used in an entropy difference is too large. That is, if there is a large differential between the values in bins to be compared, then those comparisons may be skipped to expedite the process. Moreover, match exclusion may also be appropriate if a corresponding score in the score space is too low. In addition, the processor 33 may "zoom" in on promising rotations by using a range of histogram angles, for example.

Pseudo-code for implementation of the above-described approach is set forth below, which uses the following definitions:

Loc(X)=location of histogram X in ridge-flow map
Entropy(X)=entropy of histogram X
Range(X)=range of angles in histogram X
Space=3D score space
BadScore=some negative score
Score(A,B,r)=similarity score of A and B at relative rotation r The pseudo-code is as follows:

```
1. Initialize score space to zeros
2. for every enroll histogram, A, do
      for every match histogram, B, do
         for every possible rotation, r, do
            T = rigid transformation obtained using
               Loc(A) and Loc(B)
            if (Space(T) <= BadScore)
               do nothing
            else
               if |Entropy(A)−Entropy(B)| > some
                  threshold
                  add BadScore to Space(T)
               else
                  if Range(A) and Range(B) do not
                     overlap
                     add BadScore to Space(T)
                  else
                     add Score(A,B,r) to Space(T)
3. Find maximum score and corresponding T in score space
```

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. An electronic device comprising:
   a finger biometric sensor; and
   a processor cooperating with said finger biometric sensor and configured to
      determine enrollment finger ridge flow angles over an enrollment area for an enrolled finger,
      determine match finger ridge flow angles over a match area for a to-be matched finger,
      divide the enrollment area into a plurality of regions and determine a respective enrollment ridge flow histogram for each region of the enrollment area,
      divide the match area into a plurality of regions and determine a respective match ridge flow histogram for each region of the match area,
      compare the enrollment ridge flow histograms with the match ridge flow histograms for a plurality of different positions shifted relative to one another, and
      determine a degree of similarity for each comparison of the enrollment and match ridge flow histograms.

2. The electronic device of claim 1 wherein said processor is configured to divide the enrollment area into a plurality of at least partially overlapping regions.

3. The electronic device of claim 1 wherein said processor is configured to compare the plurality of enrollment ridge flow histograms with the plurality of match ridge flow histograms also at a plurality of relative rotational angles.

4. The electronic device of claim 1 wherein said processor is configured to generate a similarity score based upon comparing the plurality of enrollment ridge flow histograms with the plurality of match ridge flow histograms.

5. The electronic device of claim 1 wherein the match area is smaller than the enrollment area.

6. The electronic device of claim 1 further comprising a memory coupled to said processor and configured to store the enrollment finger ridge flow angles.

7. The electronic device of claim 1 further comprising:
   a housing carrying said finger biometric sensor and said processor; and
   a wireless transceiver carried by said housing.

8. An electronic device comprising:
   a finger biometric sensor;
   a memory configured to store enrollment finger ridge flow angles over an enrollment area for an enrolled finger; and
   a processor cooperating with said finger biometric sensor and said memory and of configured to
      determine match finger ridge flow angles over a match area for a to-be matched finger,
      divide the enrollment area into a plurality of regions and determine a respective enrollment ridge flow histogram for each region of the enrollment area,
      divide the match area into a plurality of regions and determine a respective match ridge flow histogram for each region of the match area,
      compare the enrollment ridge flow histograms with the match ridge flow histograms for a plurality of different positions shifted relative to one another, and
      determine a degree of similarity for each comparison of the enrollment and match ridge flow histograms.

9. The electronic device of claim 8 wherein said processor is configured to divide the enrollment area into a plurality of at least partially overlapping regions.

10. The electronic device of claim 8 wherein said processor is configured to compare the plurality of enrollment ridge flow histograms with the plurality of match ridge flow histograms also at a plurality of relative rotational angles.

11. The electronic device of claim 8 wherein said processor is configured to generate a similarity score based upon comparing the plurality of enrollment ridge flow histograms with the plurality of match ridge flow histograms.

12. A finger matching method comprising:
   determining enrollment finger ridge flow angles over an enrollment area for an enrolled finger;
   determining match finger ridge flow angles over a match area for a to-be matched finger using a finger biometric sensor;
   dividing the enrollment area into a plurality of regions and determining a respective enrollment ridge flow histogram for each region of the enrollment area;
   dividing the match area into a plurality of regions and determining a respective match ridge flow histogram for each region of the match area;
   comparing the enrollment ridge flow histograms with the match ridge flow histograms for a plurality of different positions shifted relative to one another; and
   determining a degree of similarity for each comparison of the enrollment and match ridge flow histograms.

13. The method of claim 12 comparing the plurality of enrollment ridge flow histograms with the plurality of match ridge flow histograms also at a plurality of relative rotational angles.

14. The method of claim 12 wherein determining the degree of similarity comprises generating a similarity score based upon comparing the plurality of enrollment ridge flow histograms with the plurality of match ridge flow histograms.

15. A non-transitory computer-readable medium having computer-executable instructions for causing a computer to perform steps comprising:
- determining enrollment finger ridge flow angles over an enrollment area for an enrolled finger;
- determining match finger ridge flow angles over a match area for a to-be matched finger based upon a finger biometric sensor;
- dividing the enrollment area into a plurality of regions and determining a respective enrollment ridge flow histogram for each region of the enrollment area;
- dividing the match area into a plurality of regions and determining a respective match ridge flow histogram for each region of the match area;
- comparing the enrollment ridge flow histograms with the match ridge flow histograms for a plurality of different positions shifted relative to one another; and
- determining a degree of similarity for each comparison of the enrollment and match ridge flow histograms.

16. The non-transitory computer-readable medium of claim 15 further having computer-executable instructions for causing the computer to compare the plurality of enrollment ridge flow histograms with the plurality of match ridge flow histograms also at a plurality of relative rotational angles.

17. The non-transitory computer-readable medium of claim 15 wherein determining the degree of similarity comprises generating a similarity score based upon comparing the plurality of enrollment ridge flow histograms with the plurality of match ridge flow histograms.

* * * * *

UNITED STATES PATENT AND TRADEMARK OFFICE
CERTIFICATE OF CORRECTION

| | |
|---|---|
| PATENT NO. | : 9,117,145 B2 |
| APPLICATION NO. | : 13/833099 |
| DATED | : August 25, 2015 |
| INVENTOR(S) | : Boshra |

It is certified that error appears in the above-identified patent and that said Letters Patent is hereby corrected as shown below:

In the Claims

Column 8, Line 17    Delete: "and of configured"
                     Insert: --and configured--

Signed and Sealed this
Twenty-ninth Day of December, 2015

Michelle K. Lee
*Director of the United States Patent and Trademark Office*